United States Patent [19]

Seville

[11] Patent Number: 5,010,133
[45] Date of Patent: Apr. 23, 1991

[54] POLYURETHANE MOLDING COMPOSITION, METHOD AND ARTICLE

[76] Inventor: Alan R. Seville, 6422 Watercrest Way, Indianapolis, Ind.

[21] Appl. No.: 415,499

[22] Filed: Sep. 29, 1989

[51] Int. Cl.$^5$ .......................... C08L 75/04; C08K 3/36
[52] U.S. Cl. ...................................... 524/871; 524/872; 524/873; 524/875
[58] Field of Search ............... 524/590, 871, 872, 873, 524/875

[56] References Cited

U.S. PATENT DOCUMENTS

| 3,061,574 | 10/1962 | Smith | 524/875 |
| 3,062,772 | 11/1962 | Keplinger et al. | 524/590 |
| 3,395,108 | 7/1968 | Cobbledick et al. | 524/871 |
| 3,483,150 | 12/1969 | Ehrlich et al. | 524/872 |
| 3,980,606 | 9/1976 | Werner | 524/872 |
| 4,349,640 | 9/1982 | Keeney et al. | 524/875 |
| 4,551,498 | 11/1985 | Yeater et al. | 524/875 |

*Primary Examiner*—Lewis T. Jacobs
*Attorney, Agent, or Firm*—Harry J. Gwinnell

[57] ABSTRACT

A high pressure method of molding polyurethane articles is described. A polyurethane material is formed from a cross-linkable polymer comprising the reaction product of a polyol and polyisocyanate, said polymer containing a high activation temperature catalyst and a high surface area filler. The material is processed to a gum state suitable for high pressure molding. The material and process are particularly suitable for forming small, intricately shaped articles. Such articles are also described.

14 Claims, 6 Drawing Sheets

POLYURETHANE MOLDING COMPOSITION, METHOD AND ARTICLE

FIELD OF THE INVENTION

The field of art to which this invention pertains is polyurethane material, methods of making the same, molding methods utilizing such material, and the resultant articles.

BACKGROUND OF THE INVENTION

Thermoset molding is normally accomplished by low pressure or high pressure techniques. Low pressure techniques involve various types of casting, reaction injection molding or similar techniques. Castings are usually made by pouring or forcing reactable liquid mixtures into molds and heating until completely polymerized. Reaction injection molding is a process whereby two or more independent reactive liquid ingredients are metered through a mixing head where they are combined by impingement mixing and shot into a mold where they react to form a molded part. These low pressure molding methods tend to produce medium to large sized parts reasonably economically but are not as competitive when mass producing small intricate parts (for example, parts of about 20 grams or less per part).

High pressure thermoset molding involves processes such as thermoset injection molding, compression molding, transfer molding and the like, typically at pressures of the order of 200 to 2000 psi. Thermoset injection molding tends to be the opposite of thermoplastic injection molding. Thermoplastic injection molding is accomplished by melting the polymeric material and forcing it into a water cooled mold for the necessary time to solidify the parts for removal. Thermoset injection molding is accomplished by forcing a crosslinkable liquid organic into a heated mold for a controlled cure time irreversibly cross-linking the material into final parts which are removed hot.

Compression molding has been used for molding thermoset materials including various rubbers for many years and is still in common use today. The main advantages of compression molding is its simplicity. The material containing a suitable curing agent is placed in a heated cavity, the mold is closed and pressurized for the required cure time. Tool costs are relatively low and material is not wasted by formation of sprues and runners (channels) which are not required.

Transfer molding is similar to compression molding except the measured charge of thermoset material is placed into a cavity called a pot. A plunger matched to the pot walls forces the material through sprues and runners passing through a final restriction called a gate into the cavities. Air in the cavities is displaced by the incoming material through the parting line of the mold which allows passage of air but not of the thick viscous liquid. The material is maintained at 280 to 380 degrees F., rapidly curing the parts.

When attempting to make highly energy absorbent polyurethane materials having good mechanical properties, difficulties are often encountered. Frequently, when making such materials the tensile strength is low. Additionally, these liquid or low temperature meltable materials are too low in viscosity at the higher processing temperatures (about 300 degrees F.) for the preferred high pressure molding systems. High pressure systems, especially transfer molding, are really needed to produce small intricate parts very economically. The problem comes when attempting to mass produce large volumes of thermoset parts from liquid components using high pressure molding, and especially transfer molding. The low viscosity of the liquids allows them to flow through the mold parting line under the high pressure. As a result, the liquid leaks out and the pressure goes to zero resulting in incomplete parts.

BRIEF SUMMARY OF THE INVENTION

It is object of this invention to provide a method for making a normally liquid thermoset polyurethane material useful in molding processes, particularly high pressure processes like compression or transfer molding.

It is another object of this invention to provide a polyurethane material that has a stable gum-like state that facilitates easy handling and processing, that after being softened by heat is viscous enough for use in the molding processes and that is useful for molding small intricately shaped articles.

It is a further object of this invention to provide a method for making a cross-linkable polyurethane polymeric material for high pressure molding small intricately shaped articles, for example, useful as vibration isolators and shock mounts and the like, especially in precision instruments and equipment, e.g. computer equipment.

It is also an object of this invention to provide molded thermoset polyurethane articles featuring a combination of properties including vibration damping, mechanical strength, environmental resistance and stable properties over a broad operating temperature range, e.g., −40 degree C. to 150 degree C.

The present invention is directed to a polyurethane gum material made up of a cross-linkable mixture of polyol, polyisocyanate, high activation catalyst, and high surface area filler, the gum material being capable of high pressure molding.

Another aspect of the invention is a process of producing the polyurethane gum material by partially reacting a cross-linkable mixture of polyol, polyisocyanate, high activation catalyst, and high surface area filler, to the point that it is handlable but still capable of substantial cross-linking and flowable under high pressure molding conditions.

Another aspect of the invention are articles produced from the above material having a 10 Hertz material loss factor equal to or greater than about 1.0 at a temperature between −10 degrees C. and 30 degrees C.

Another aspect of the invention is a method of molding using the above polyurethane gum material by heating the gum material to a viscous state capable of flowing, high pressure molding an article out of the polyurethane material, and curing the polyurethane material to form the molded article.

Other details, objects and advantages of the invention and methods for making and using the same will become apparent from the following detailed description and accompanying drawings.

DETAILED DESCRIPTION OF THE INVENTION

Figure 1:
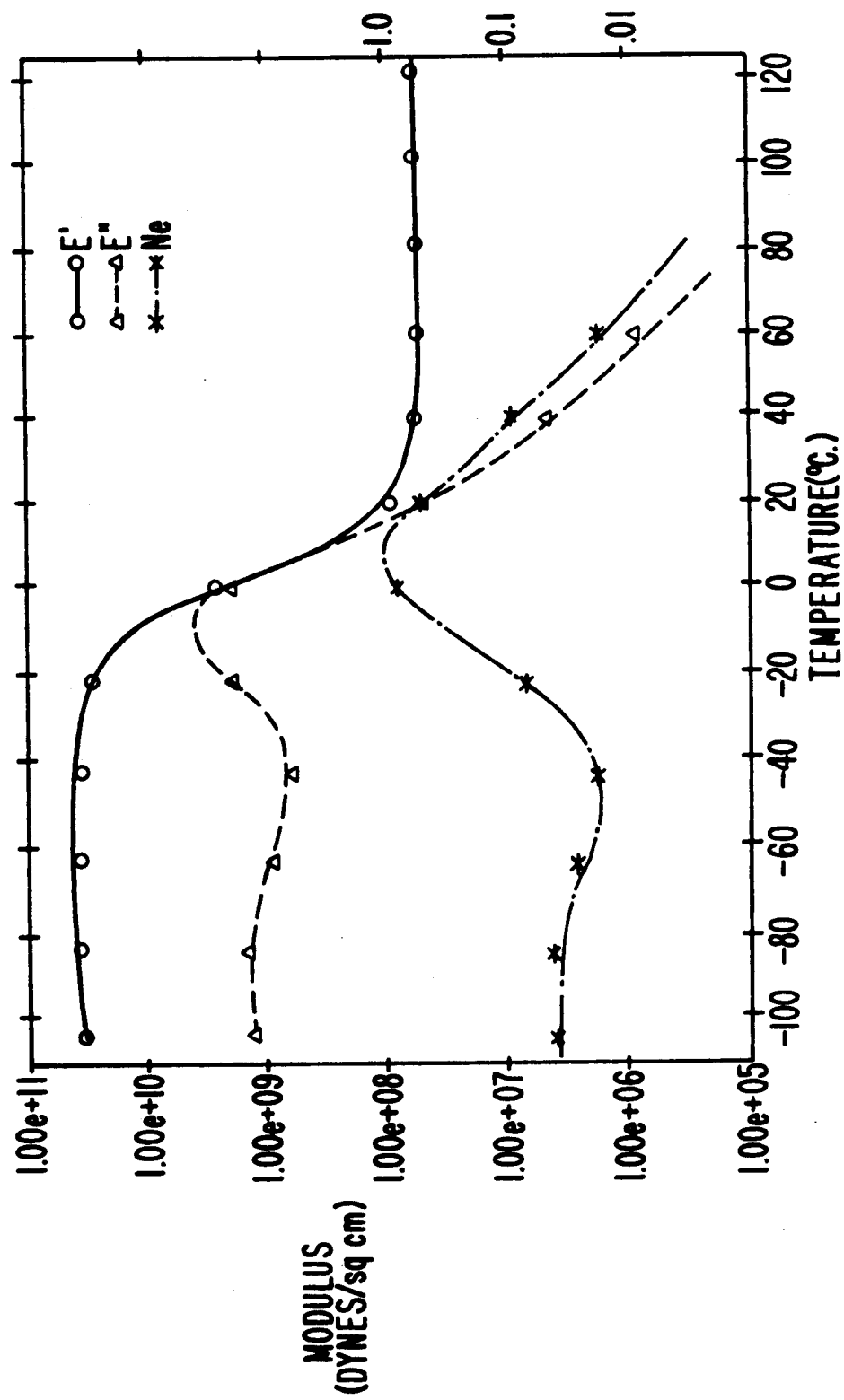
FIG. 1 is a plot of the dynamic properties of a molded polyurethane made in accordance with the invention.

This invention provides a process for preparing a moldable cross-linked polyurethane material comprising the steps of preparing a mixture including a cross-linkable polymer, such as a urethane polymer, a filler, such as fused silica, and a catalyst having a high activation temperature, such as metal salt of a fatty acid.

The cross-linkable polymer can advantageously be added as a prepolymer or mixture of the monomers. The mixture of prepolymer, filler and catalyst is heated at a temperature below the catalyst activation temperature for a period of time sufficient to effect polymerization of the monomers but with little or no incidental cross-linking. It may also be advantageous to include a small quantity (e.g. about 0.01 weight percent of the total mixture) of low temperature polymerization catalyst (e.g. dibutyl tin, etc.) to speed polymerization of the prepolymer. Of course, the polymerization catalyst should not effect cross-linking of the polymer at or below cooking temperatures.

The cooking step increases the viscosity of the mixture until it reaches a gum-like state suitable for molding using high pressure molding methods. Quite often it is convenient when processing the preferred polyurethane, to use the Shore Hardness of the resultant gum to determine suitability for high pressure processing. Once a suitable range of workable viscosity or hardness is established for a given formulation a viscometer may be employed in the process for establishing when the material is ready for high pressure molding.

The resulting gum-like plastic material may cure and eventually cross-link slowly at room temperature, but is more stable at lower temperatures. It appears that the gum-like plastic material can be stored indefinitely at freezer temperatures less than about −26 degree C.

The cross-linkable polyurethane and isocyanate polymers useful in the practice of this invention can be prepared in a gum-like state that is stable at low temperatures, workable at room temperatures and that can be liquefied (heated to a viscous state, i.e. softened enough to freely enter the mold under pressure, but viscous enough not to leak out of the mold, e.g. at the mold parting line) and fully cured in a mold cavity at elevated temperatures and pressures. These polymers can be provided with substituent functional groups, in addition to those useful for cross-linking, as hereinafter described. The additional functional groups such as amine, hydroxyl or other groups having reactive hydrogens may be useful for bonding to metals or other materials directly or with the aid of conventional adhesives or the like.

Highly energy absorbing polyurethane materials for the purpose of this invention are those cross-linked polymer networks having a material loss factor of about 1.0 or more at 10 Hertz within the temperature range of −10 degree C. to +30 degree C.

The polyurethanes are formed from the exothermic reaction of polyisocyanates with polyol molecules containing hydroxyl groups. All are produced from relatively few basic isocyanates and a range of polyols of different molecular weights and functionalities. The term polyurethane is applied to any polymer that has been chain extended by reaction with di- or polyisocyanate. The isocyanate group (—NCO) can react with any compound containing active hydrogen atoms. Several aromatic and aliphatic diisocyanates are available, but 95% of all polyurethanes are based on two polymeric diisocyanates, toluene diisocyanate (TDI) and diphenylmethane diisocyanate (MDI) and its derivatives.

A wide range of polyols are used in the polyurethane manufacture. Most fall into two classes, hydroxyl-terminated polyethers or hydroxyl-terminated polyesters. The choice of polyol, especially the size and flexibility of its molecular structure and its functionality, controls to a large extent the degree of crosslinking in the polymer. This has a dominant effect on the stiffness of the polymer, the higher the proportion of crosslinking, the stiffer the polymer.

Most of the polyether polyols used to make flexible polyurethane elastomers are triols based on trifunctional initiators, mainly glycerol or trimethylolpropane. Polyether diols, made using glycol initiators, are also frequently used, often together with triols, in making such elastomers.

Polyester polyols tend to be more expensive and difficult to handle than polyether polyols. Consequently they are only used to make polyurethanes for demanding applications where the particular physical properties obtained from polyesters are important. Such properties include high levels of tensile properties combined with resistance to flexing and abrasion. They also have good resistance to heat and many types of oil.

A number of catalysts can be used for the reaction of the isocyanates with both the polyols and water. These include aliphatic and aromatic tertiary amines and organo-metallic compounds, especially tin compounds such as dibutyl tin, although compounds of mercury, lead or bismuth are also used.

The polyester polyols are suitable ingredients similar to those utilized for the polyether based system so as to produce a series of polyester based polyurethanes having molecular weights between cross-links of from about 9000 to about 16000 using the equation as stated below. Likewise this series of polyester polyurethanes should have percent hard segments (hard crystalline segments of short polymer groups) of about 10 to about 25.

Using a dynamic mechanical tester such as a Rheometrics Dynamic Analyzer (the Rheometrics Dynamic Analyzer is available from Rheometrics, Inc., Piscataway, NJ) at a test frequency of 10 Hertz determine the temperature of the peak material loss factor for each sample within the series.

Plot the peak material loss factor for each sample against the Mc or percent hard segment. This will yield a curve suitable for extrapolating to a formulation having a peak material loss factor of about 1.0 or more at 10 Hertz within the temperature range of −10 degree C. to 30 degree C.

When making highly energy absorbing polyurethanes the general approach is to select polyethers having average molecular weights of about 600 to about 1000 or polyesters having average molecular weights of about 1500 to about 2500. To the polyether or polyester polyols are added suitable cross-linkers which are lower molecular weight polyols having a functionality of greater than two (2) and the diisocyanate which may have a functionality of two (2) or more along with suitable monofunctional components to produce a series of polyether based polyurethanes having molecular weights between cross-links (Mc) of from about 5000 to about 12,000 using the equation:

$$Mc = \text{Gram Wts.} \times \frac{\text{Functionality of Crosslinker}}{\text{Equivalents of (Crosslinker} - \text{OH} + \text{NCO})}$$

where (OH+NCO) is the positive difference between equivalents of polyol(s) and isocyanate.

Likewise this series of polyether polyurethanes should have percent hard segments of about 30 to about 45 calculated by dividing the diisocyanate plus chain extender (low molecular eight diols such as butanediol) by the total weight of ingredients (not counting filler and the like) and multiplying by 100.

The constituents of this invention also include a cross-linker that has functional substituents of the cross-linkable polymer or a separate compound or mixture of compounds, capable of covalently bonding one polymer molecule to another in a catalyzed reaction, or initiated by the high temperature catalyst under molding conditions. Useful cross-linkers includes multifunctional compounds such as polyols, e.g., trimethylol propane, glycerol, oxpropylated sorbitol and the like.

The preferred polyurethane gum materials of this invention have been found to have Shore 00 Durometer hardness of 40 to 60 although this can be modified by use of high filler loadings. A dual system for increasing the mold process viscosity can be used consisting of partially reacting the cross-linkable polyurethane mixture and simultaneously thickening by the use of a high surface area filler or reinforcing filler. This forms a gum which processes well using high pressure molding systems such as theromoset injection molding, compression molding, transfer molding and the like, even for small, intricately shaped parts. The use of a higher activation temperature catalyst does not interfere with formation of the gum which not only allows for full cure upon processing but along with the high surface area filler yields higher physical properties for the resultant molded parts.

The above system allows for high melt viscosity gums to mass produce small intricately shapen articles, e.g. small parts of under 20 grams per part down to about 1 gram per part by the preferred method of transfer molding. These parts are of high quality, and low cost with excellent energy absorbing properties. These low compression set parts are ideal for protecting precision equipment My preferred ingredients are polyester diols used along with diisocyanate, a polyol cross-linker, a high temperature catalyst and a high surface area filler. Part of the diol and diisocyanate can preferably be added as a prepolymer usually prepared by prior reaction of a portion of the polyol with an overabundance of the diisocyanate so as to cap most all of the polyol reactive alcohol groups with one of the isocyanate groups of the diisocyanate leaving the other group available for later reaction.

Although I prefer diols, diisocyanates and cross-linker, polyols with a functionality of greater than 2 can be employed, for example triols and the like. Likewise preferred diisocyanates can be replaced with materials having a functionality of greater than 2.

The high surface area fillers useful in the practice of this invention strengthen the polyurethane material and may be selected to improve the physical properties of that material in both the gum-like and cured states. Three poplar descriptions of high surface area fillers are Mean Particle Size, Particle Surface as determined by BET nitrogen surface area measurement and oil absorption. Fumed silica is preferred although other fillers having BET surface areas of greater than about 40 meters$^2$/gram can be used. Examples of useful fillers are fumed silica, carbon black or other high surface area filler having reinforcing properties. CAB-O-SIL(tm) fumed silica available from Cabot Corporation is a preferred filler.

The catalysts useful in this invention are elements or compounds that either start (initiate) or augment the rate of the cure reaction among the cross-linkable polymer molecules at elevated temperatures including homogenous (e.g. zinc stearate) and heterogenous (e.g. zinc and calcium stearates) compounds, as well as what are elements or compounds commonly referred to as initiators. Cross-linking covalently links various individual polymer molecules into a three-dimensional network. Metallic soaps, such as water insoluble compounds which contain an alkaline earth or a heavy metal combined with a monobasic carboxylic acid of 7 to 22 carbon atoms and having a melting point greater than about 100 degree C. are preferred. Zinc stearate, having a melting point greater than 120 degree C. is most preferred due to its high activation temperature and low toxicity. The term "high activation temperature" means that the cross-linking catalyst does not initiate or augment the cross-linking reaction at temperatures substantially less than the temperature at which the polyurethane material (including the catalyst) is to be molded.

The compositions of this invention may also include various auxiliary ingredients such as pigments, external plasticizers flame retardants, smoke suppressant, blowing agents, stabilizers, antimicrobials etc.

EXAMPLE

A laboratory batch of moldable, cross-linkable polyurethane in a gum-like state was prepared as follows:

| Ingredients | Weight (g) | Weight % |
| --- | --- | --- |
| 1. *Solithane 790 (Morton,Int'l.) (urethane prepolymer/NCO content of 4.56%) | 2000 | 84.80 |
| 2. Fumed Silica (Cab-O-Sil filler) | 50 | 2.12 |
| 3. Refined Soy Sterol (Kraft Generol plasticizer) | 49.4 | 2.01 |
| 4. PDEA (phenyl diethanolamine) (chain extender and low temperature catalyst) | 96.4 | 4.09 |
| 5. Zinc stearate (high temperature catalyst) | 30.7 | 1.30 |
| 6. Pigment (e.g. carbon black) | 6.3 | 0.27 |
| 7. Oxypropylated sorbitol (Hexol-Union Carbine) | 125.6 | 5.35 |

| Ingredients | Weight (g) | Weight % |
|---|---|---|
| (cross-linker) | | |

*Urethane prepolymer of Toluene Diisocyante (TDI) and a polyol.
(Generol 122 Series preferred, especially E-5, 16, and 25)
(Cab-O-Sil M-5, L-90, LM-130, HS-5, HS-55 preferred)

The components (1 through 4 and 7) were preheated to about 100 degrees C. The components 1 through 6 were combined in a 2 gallon Ross planetary mixer bowl and mixed at speed setting 6 on the mixer for about 1 hour under vacuum of less than 10 mm Hg. The mixer bowl was maintained at temperatures of 70–90 degrees C. using a heater. Component 7 was added and mixing continued at speed setting 6 under the same vacuum for an additional 15 minutes. The mixture was cast in heated molds and cured at 90 degrees C. until the material gelled on a plate at 155 degrees C. within 4 to 5 minutes. The molds were removed from the oven and cooled 1 hour under a fume hood and placeed in a freezer ($-15$ degree C.) for 4 hours. The formed gum was removed from the mold.

The resulting gum-state thermoset polyurethane material was thereafter stored at freezer temperatures of about $-26$ degree C. Portions of the test batch were molded in a transfer mold at 150 degrees C. using a plunger pressure of 300 psi (pounds per square inch) and an eight minute cure time. (The heated gum typically has a Rheometer torque rating (ASTM D2084) of 0.5 to 10 inch pounds at 300 degrees F. going into the mold.) Finished parts (such as grommets for precision instruments like computer disk drives) were then post cured at 90 degrees C. for 16 hours prior to testing.

Dynamic Properties

The Loss Factor and Young's Modulus of test samples from the Example were measured over a temperature range of about $-100$ to 80 degrees C. on a Rheometrics Dynamic Analyzer at 10 Hz (available from Rheometrics Inc) in accordance with ASTM D4065. The results of the measurements are summarized in FIG. 1. The data in FIG. 1 shows that the test samples had a consistent Young's Modulus in the range of about 25 to 100 degrees C. indicating they will provide a uniform natural frequency throughout this range. The 10 Hertz material loss factor of about 1.0 is within the temperature range of $-10$ degree C. to 30 degrees C.

Figure 2:
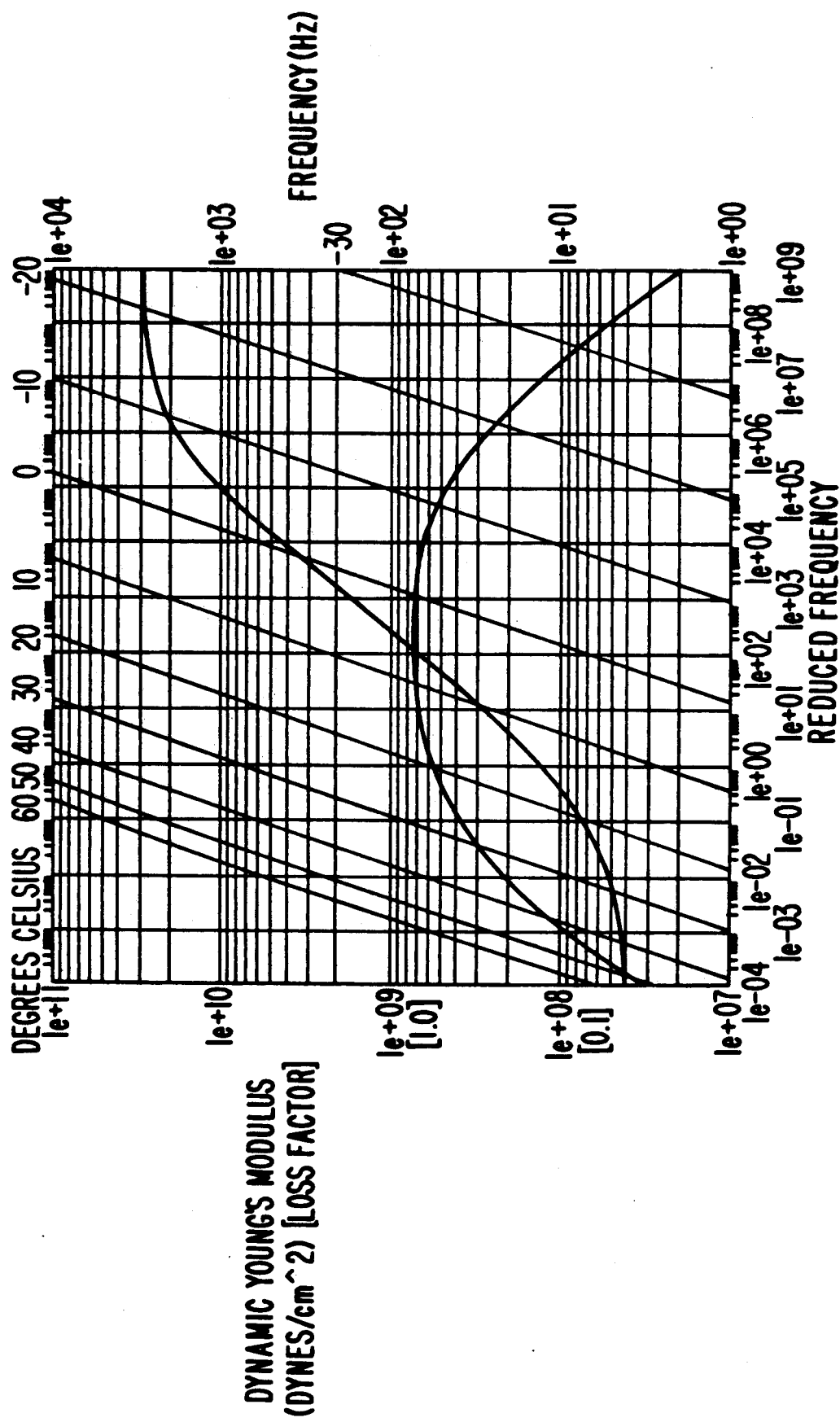
FIG. 2 is a nomogram illustrating the vibration damping properties of a molded polyurethane made in accordance with the invention.

The Young's modulus and loss factors as measured above were plotted on the reduced frequency nomogram FIG. 2 illustrating the damping properties of the test samples.

Compression Set

Figure 3:
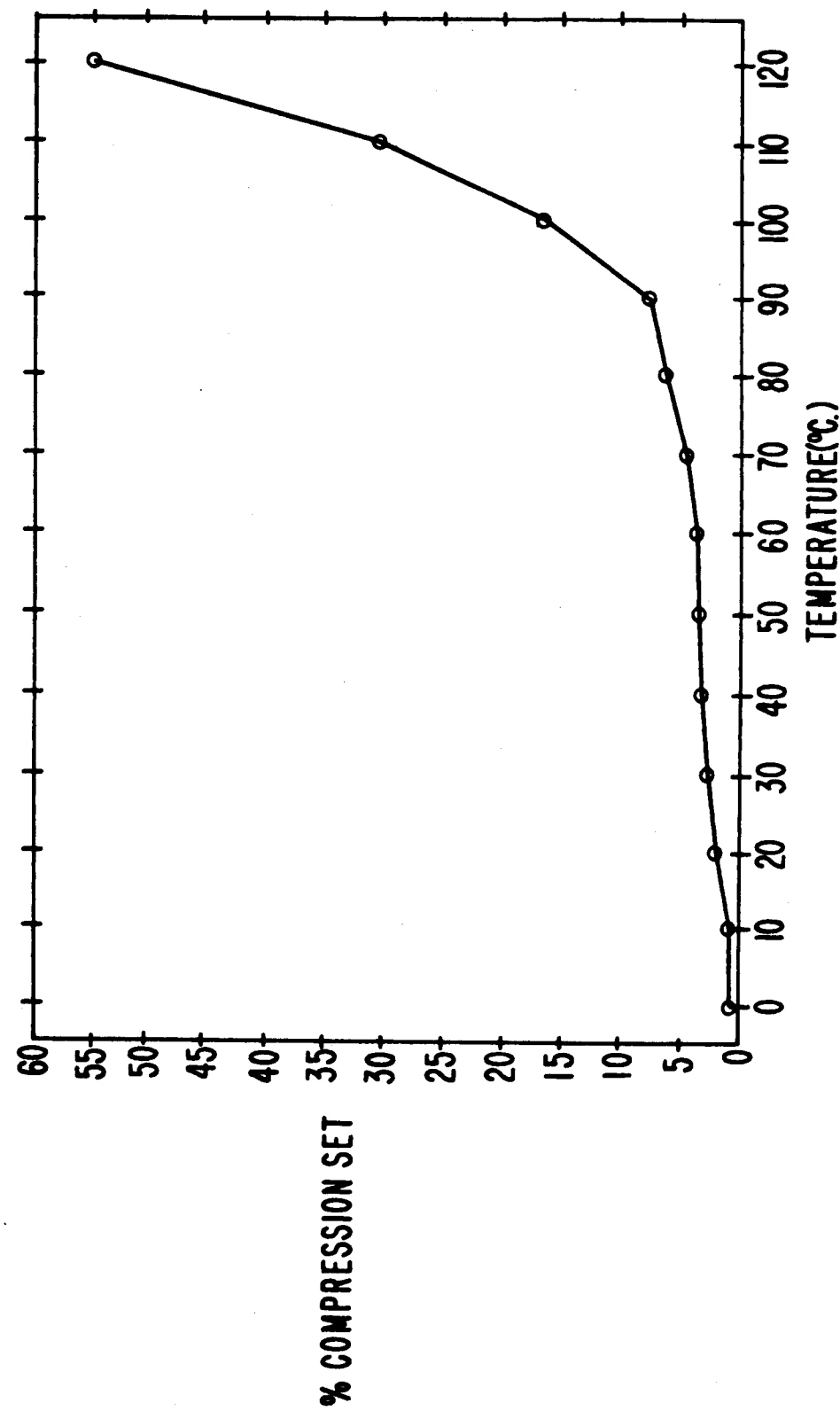
FIG. 3 is a plot illustrating the compressive set properties of a molded polyurethane made in accordance with the invention.

The percent compression set versus temperature (degrees C.) for test samples from the Example were measured in accordance with ASTM D395 B Method. The results of these measurements are summarized in FIG. 3. The data presented in FIG. 3 shows that the test samples were mechanically strong, having a low degree of set and were dimensionally stable over time under higher than normal isolation loads.

Compression Creep

Figure 4:
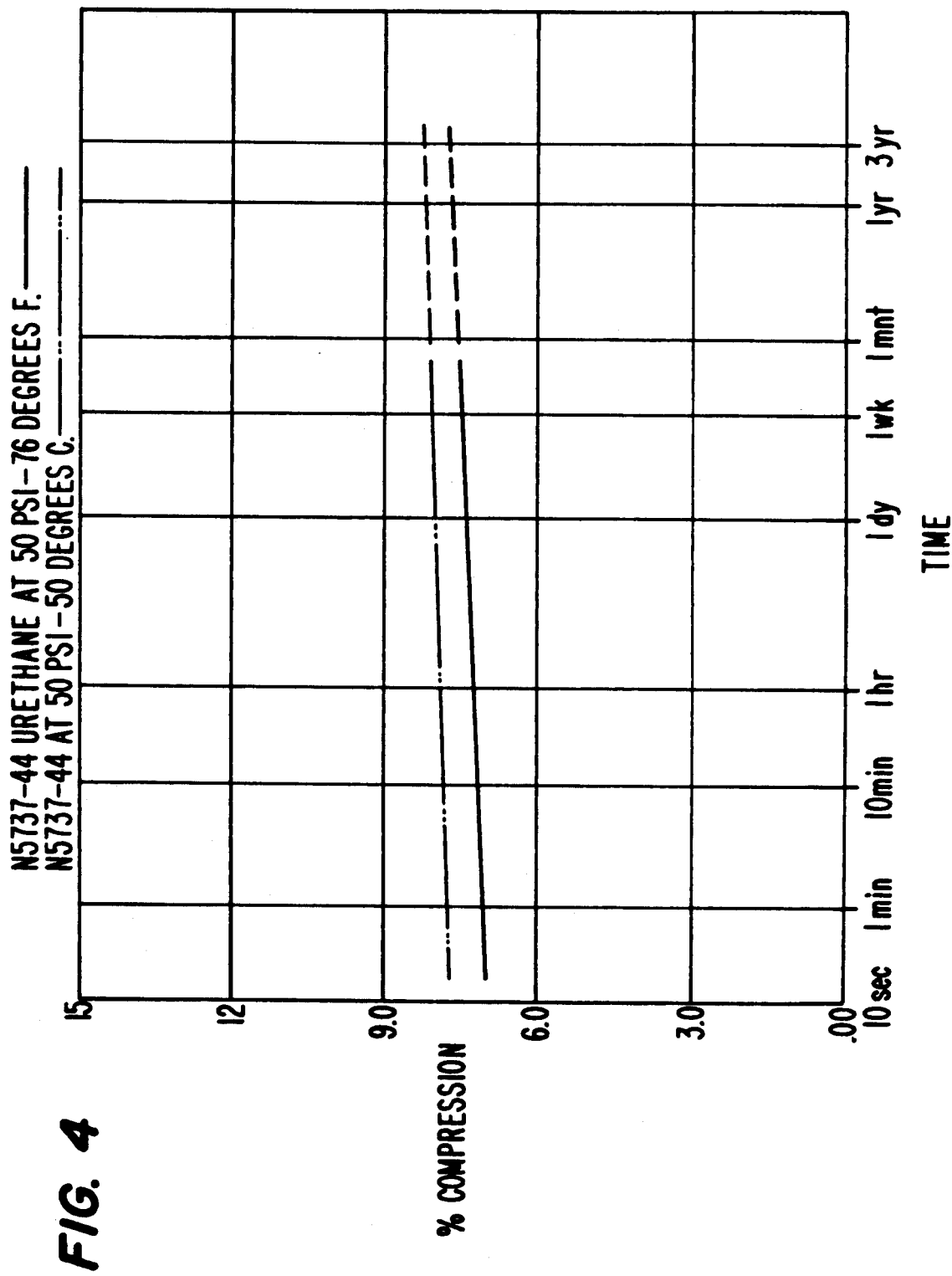
FIG. 4 is a plot illustrating the compressive creep properties of a molded polyurethane made in accordance with the invention.

The percent compression versus time for test samples form the Example were measured in accordance with ASTM D2990. The results of these measurements are summarized in FIG. 4. The data presented in FIG. 4 shows that the test samples were resistant to compression deflection drift or creep over the long term at loads typically encountered in isolation applications.

Stress Relaxation

Figure 5:
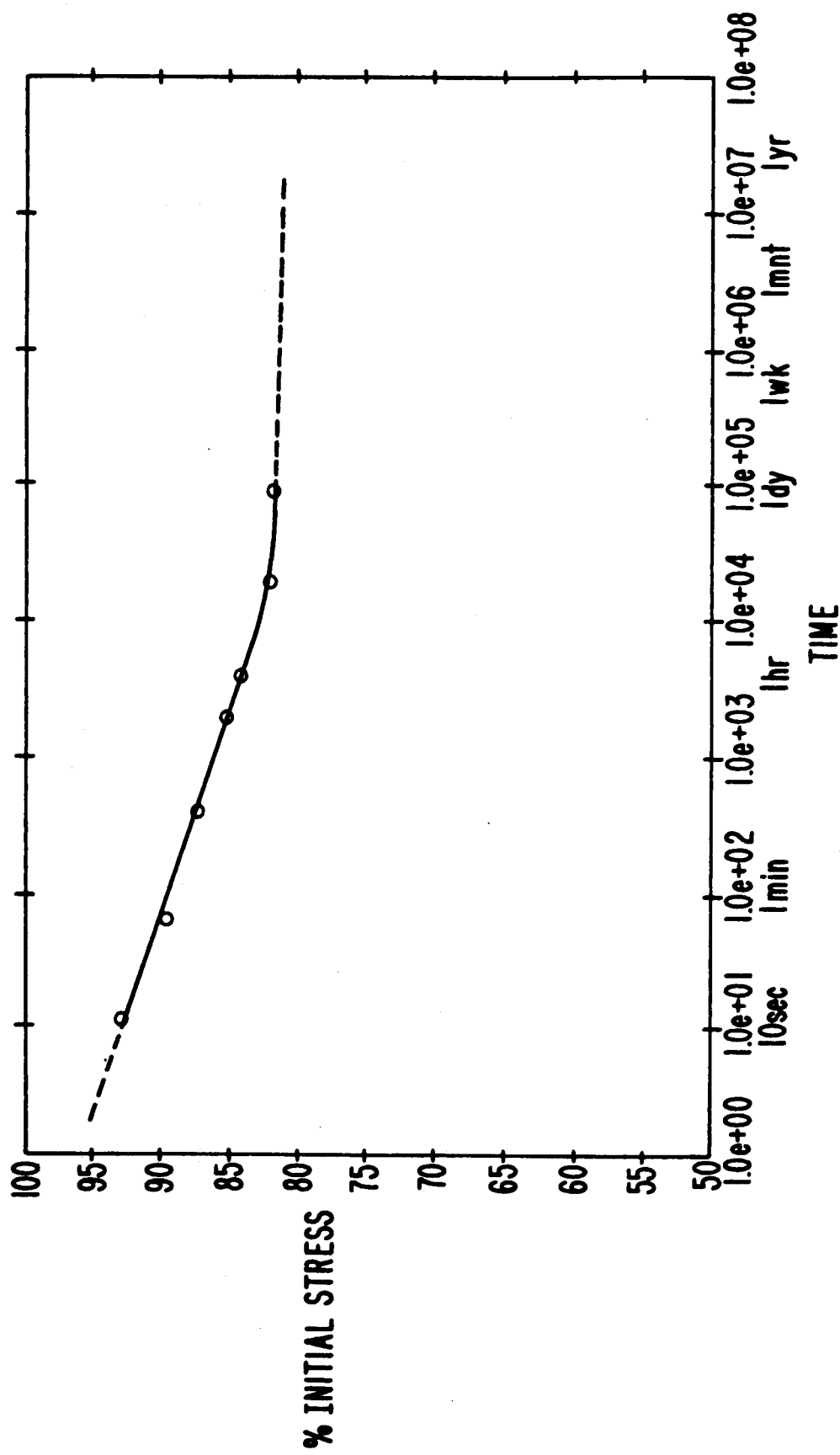
FIG. 5 is a plot illustrating the stress relaxation characteristics of a molded polyurethane made in accordance with the invention.

Initial Stress (%) versus time (seconds) for test samples from the Example were measured in accordance with ASTM F38. The results of these measurements are summarized in FIG. 5. The data presented in FIG. 5 shows the load stability of the test samples which indicate that the material is useful for gasket materials.

Temperature Stability

Figure 6:
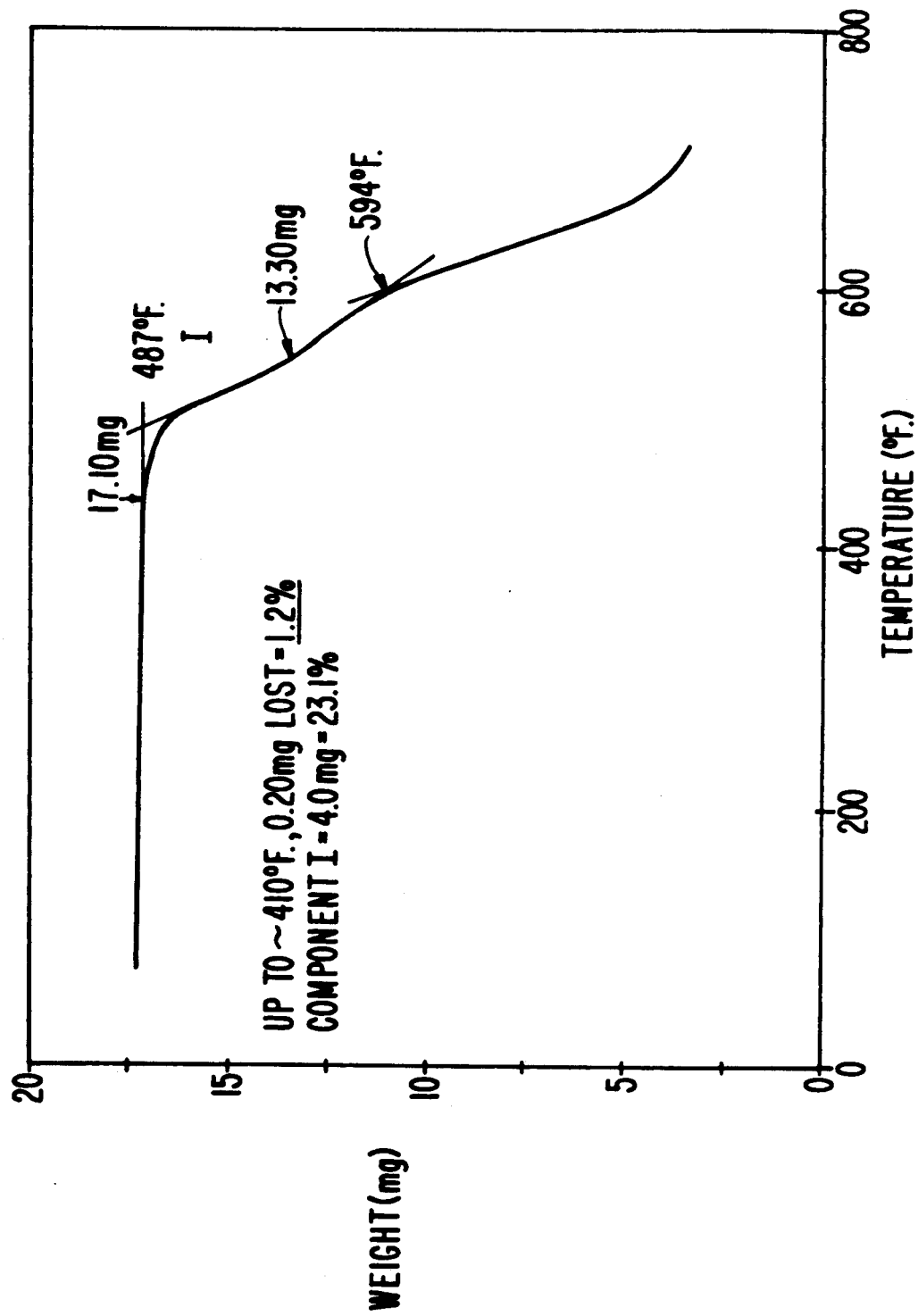
FIG. 6 is a plot illustrating the temperature stability properties of a molded polyurethane made in accordance with the invention.

A thermogravimetric analysis (2° F./minute in air) was performed on a test sample from the Example. The results of the analysis presented in FIG. 6 show that the test sample did not undergo significant decomposition until nearly 487° F.

A thermoset polyurethane material selected to make a particular molded article must not only provide the physical properties required of the finished article design, but also the processing properties required by the molding process chosen to make the article. For example, compression or transfer molding may be the most advantageous methods for mass production of a small intricately shaped article; but, a polyurethane having the necessary physical properties particularly in a stable state in which it can be easily introduced into a compression or transfer mold and then sufficiently softened with heat and pressure so that it can be transferred into and fill the mold cavity, must be used. The material of the present invention accomplishes this result.

Other important design considerations are achievable by the material of the present invention in a high pressure molding process, particularly the physical properties required of the finished article, e.g., oil resistance, damping, hardness, outgassing, electrical conductivity, compression set, compressive creep, tensile strength, elongation, tear strength, bonding to metal, high temperature stability and abrasion resistance. The parts are also environmentally resistant to various chemicals, sunlight, ultra-violet light, ozone, etc. Typical parts include vibration isolation ribbed grommets, small motor dampers, cabinet feet isolators, etc.

Although we have set forth certain present preferred embodiments of our moldable thermoset plastic materials and methods of making and using the same, it should be understood that the invention is not limited thereto but may be variously embodied within the scope of the following claims.

What is claimed is:

1. A polyurethane gum material produced by partially reacting a cross-linkable mixture of polyol, polyisocyanate, high activation temperature catalyst and a high surface area filler, the gum material being stable at low temperatures, hand-workable at room temperatures, and capable of being liquified and high pressure molded at elevated temperatures.

2. A process of producing a polyurethane gum material by partially reacting a cross-linkable mixture of polyol, polyisocyanate, high activation temperature catalyst and a high surface area filler, the gum material being stable at low temperatures, hand-workable at room temperatures, and capable of being liquified and high pressure molded at elevated temperatures.

3. A cross-linked, energy absorbing polyurethane article produced from a cross-linkable polymer comprising the reaction product of a polyol and polyisocyanate, said polymer containing a high activation temperature catalyst and a high surface area filler, said article having a 10 Hertz material loss factor equal to or greater than about 1.0 at temperatures between −10 degrees C. and 30 degrees C.

4. A method of molding comprising heating a polyurethane gum material comprising a partially reacted cross-linkable mixture of polyol, polyisocyanate, high activation temperature catalyst and a high surface area filler to a viscous state, high pressure molding an article from the heated gum material, and curing the polyurethane gum material to form the molded article.

5. The invention of claim 3 or 4, wherein the article weighs up to 20 grams.

6. The article of claim 3 or 4, wherein the invention weighs up to 5 grams.

7. The process of claim 2 wherein a viscometer is employed to monitor the cure of the polymer mixture to produce the polyuretane gum material capable of being high pressure molded.

8. The invention of claim 1, 2 or 3 wherein the polyol is a polyester polyol.

9. The invention of claim 1, 2 or 3 wherein the filler is fumed silica.

10. The invention of claim 1, 2, or 3 wherein the high activation temperature catalyst is zinc stearate.

11. The invention of claim 1, 2 or 3 wherein the filler is fumed silica.

12. The invention of claim 3 or 4 wherein the article is a small, intricately shaped article.

13. The invention of claim 3 or 4 wherein the article is a vibration isolator or shock mount, especially adapted for use in a precision instrument.

14. The invention of claim 3 or 4 wherein the artilce exhibits a combination of properties including vibration damping, mechanical strength, environmental resistance and stability over a temperature range of −40 to 150 degrees C.

* * * * *

UNITED STATES PATENT AND TRADEMARK OFFICE
CERTIFICATE OF CORRECTION

PATENT NO. : 5,010,133
DATED : April 23, 1991
INVENTOR(S) : Alan R. Seville

It is certified that error appears in the above-indentified patent and that said Letters Patent is hereby corrected as shown below:

Column 6, Line 12 " poplar "
   Should read: -- popular --

Column 7, Line 66 " form the Example "
   Should read: -- from the Example --

Column 10, Line 1 " polyuretane "
   Should read: -- polyurethane --

Column 10, line 16, "wherein the artilce"
should read  --wherein the article--

Signed and Sealed this

Fifth Day of October, 1993

Attest:

BRUCE LEHMAN

*Attesting Officer*   *Commissioner of Patents and Trademarks*